Jan. 7, 1936.  J. P. LAWRENSON  2,026,687
COMBINED FREIGHT AND TANK VEHICLE
Filed Sept. 26, 1933    2 Sheets-Sheet 2

Inventor
Judge P. Lawrenson
By Hardway Cather
Attorneys

Patented Jan. 7, 1936

2,026,687

UNITED STATES PATENT OFFICE 2,026,687

COMBINED FREIGHT AND TANK VEHICLE

Judge P. Lawrenson, Houston, Tex.

Application September 26, 1933, Serial No. 691,025

1 Claim. (Cl. 280—5)

This invention relates to a vehicle and has particular relation to that type of vehicle specially designed for transporting merchandise, freight, and the like.

An object of the invention is to provide, in a vehicle, a combination body and tank construction whereby ordinary merchandise, freight and the like as well as liquids may be readily transported.

Another object is to provide a vehicle having a body construction and an underslung tank secured to and depending from the body designed for containing a liquid or liquids and which also serves to stabilize the vehicle and to balance the load carried in the body whereby the vehicle will be less likely to be overturned.

A further object is to provide in a vehicle a novel type of body construction.

With the above and other object in view, this invention relates to certain novel features of construction, arrangement of parts and an example of which is given in this specification and illustrated in the accompanying drawings wherein.

Figure 1:
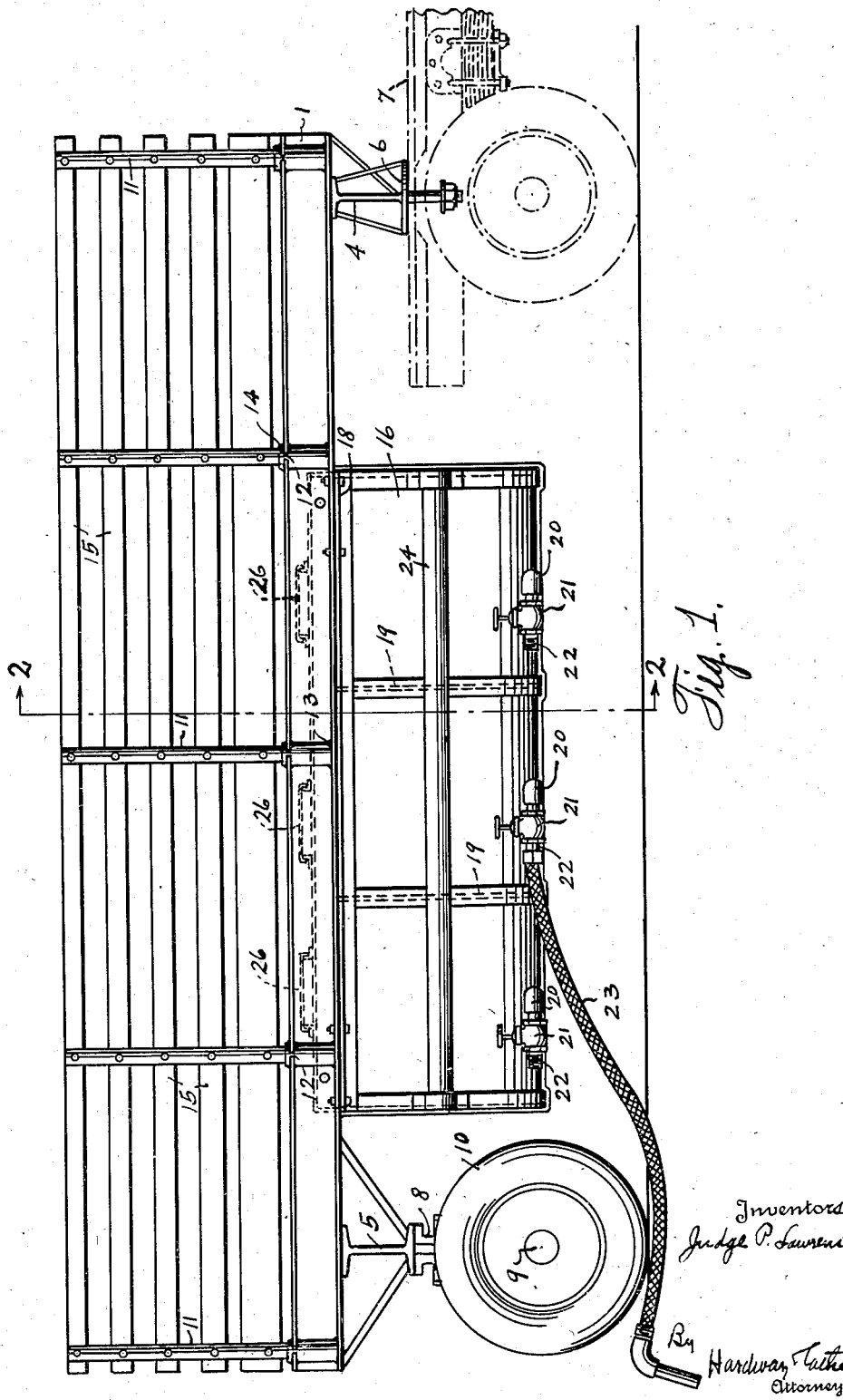
Figure 1 shows a side view of the vehicle.
Figure 2:
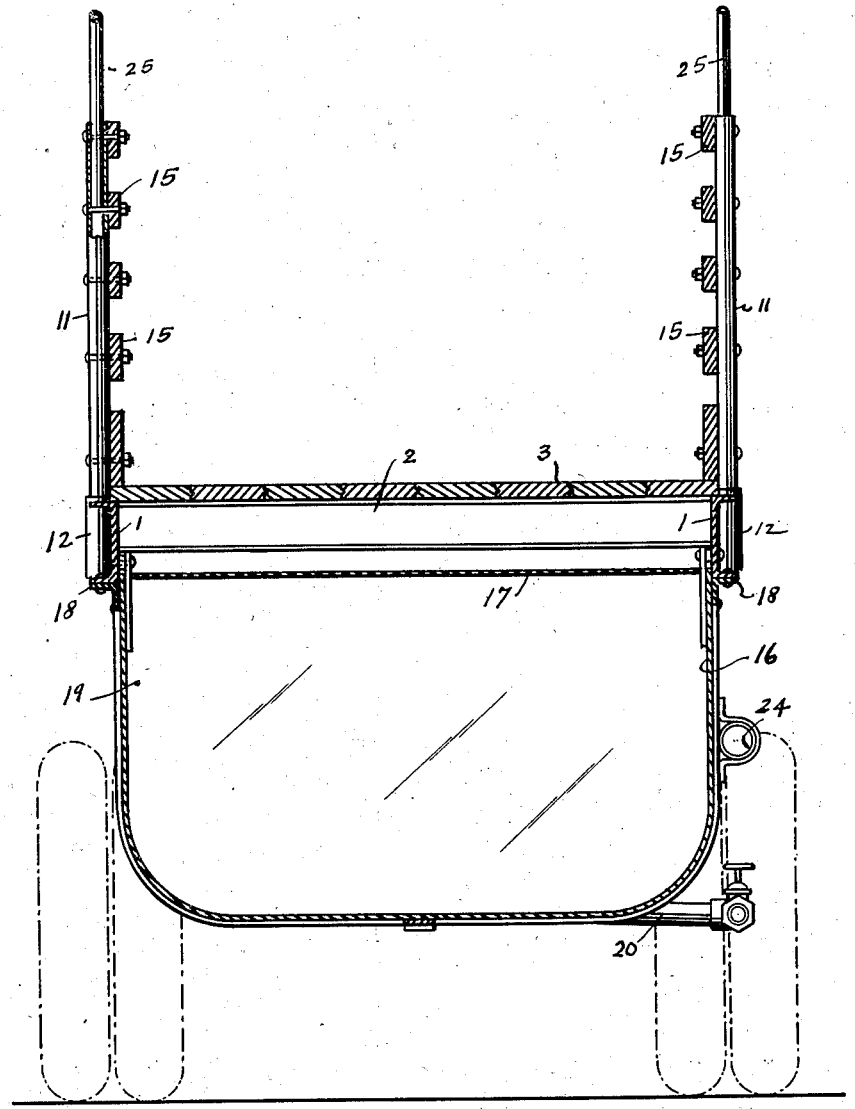
Figure 2 shows a transverse vertical sectional view, taken on the line 2—2 of Figure 1.

Referring now more particularly to the drawings, wherein like numerals of reference designate similar parts in each of the figures the numerals 1, 1 designate the side members of the frame preferably formed of channel irons whose flanges are turned outwardly. These channels are connected by suitable front and rear cross bars as 2 on which the floor 3 of the body is supported. The framework is supported on the front and rear transverse I-beams 4, 5 the former of which has the front turn table 6 secured thereto adapted to rest on the rear end of the frame of a suitable tractor 7. The I-beam 5 is supported on the bolster 8 which, in turn, rests on the rear axle which is supported by the rear wheels as 10.

At each side of the body there are the upstanding standards 11 preferably formed of sections of pipe. These standards have their lower ends fitted into the sleeves 12 which fit through the upper flange of each channel and whose lower ends rest on the lower flanges, of said channels and said sleeves may be welded to said lower and upper flanges as indicated at 13 and 14. The sides of the body may be formed of lengthwise bars as 15 which may be bolted to the inner sides of the standards 11 on each side of the body and which may be spaced apart as shown. The sides of the body may be thus bodily lifted from, or assembled with, bottom 3.

The ends of the body may be left open for loading and unloading purposes but when the body is loaded, chains or cables may be attached to the end standards and drawn across the ends of the body to retain the contents of the body in place.

There is an underslung tank 16 having the flat top 17 and having the outwardly turned lengthwise flanges 18, one on each side, which fit against the undersides of the lower flanges of the side members 1 and which may be bolted, and if desired, welded, to said lower flanges of said side members. This underslung tank may be of any desired length depending on the length of the body and may have transverse partitions 19, 19 to separate the said tank into separate compartments so that different kinds of liquids may be transported at the same time.

Leading out from the bottom of each compartment there is a pipe 20 which is equipped with a control valve 21 and which terminates in a nipple 22. A delivery hose 23 may be attached to a nipple 22 and the corresponding valve opened and the contents of the corresponding compartment drained out. Each compartment may have a man hole in the top thereof, normally closed by a removable cover 26, for filling purposes.

Attached to one side of the tank 16 there is a longitudinal tubular housing 24 to receive and retain the hose 23 when it is not in use.

In case a load of unusual height is loaded into the body supplemental standards 25, 25 may be used for the purpose of retaining said load. For this purpose one or more of the bolts at the upper ends of the standards 11 may be removed and the supplemental standards 25 inserted into the upper ends of the standards 11 and the removed bolts then replaced, said supplemental standards having holes to receive said bolts and said supplemental standards are thus secured firmly in place.

By the use of the construction hereinabove described a vehicle, particularly a trailer, or a railway car or similar vehicle may be used for transporting freight and merchandise of any character and both liquid and dry goods may be transported, if desired, at the same time, and the construction is such that the liquid load will assist in balancing the load in the vehicle body which is very desirable particularly when the body load is top heavy.

The drawings and descriptions disclose what is now considered to be a preferred form of the invention by way of illustration only while the broad principle of the invention will be defined by the appended claim.

What I claim is:

A truck comprising a frame having side members formed of channel irons provided with upper and lower horizontal flanges, a body having a floor on the frame and having sides, carrier wheels on which the frame is mounted, an underslung tank of approximately the same width as that to the frame and located between the front and rear wheels and having longitudinal side flanges which are secured to the lower flanges of the frame, vertical sleeves between said upper and lower flanges and welded thereto, and spaced apart and forming reinforcing means for reinforcing the side members of the framework to additionally support the load on the floor and in the tank underneath standards whose lower ends are fitted into the sleeves and to which the sides of the body are secured.

JUDGE P. LAWRENSON.